US008644673B2

(12) United States Patent
Martin et al.

(10) Patent No.: US 8,644,673 B2
(45) Date of Patent: Feb. 4, 2014

(54) AUGMENTED REALITY SYSTEM FOR RE-CASTING A SEMINAR WITH PRIVATE CALCULATIONS

(75) Inventors: David Martin, Melrose, MA (US); James Grundner, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 13/325,289

(22) Filed: Dec. 14, 2011

(65) Prior Publication Data

US 2012/0243848 A1 Sep. 27, 2012

Related U.S. Application Data

(60) Provisional application No. 61/466,095, filed on Mar. 22, 2011.

(51) Int. Cl.
*H04N 9/80* (2006.01)
*G09G 5/00* (2006.01)
*G03H 1/00* (2006.01)

(52) U.S. Cl.
USPC ........... 386/239; 386/240; 386/241; 386/248; 359/13; 345/7; 345/8; 345/9; 345/629; 345/663

(58) Field of Classification Search
USPC ......... 345/7, 8, 9, 629, 663; 359/13; 386/239, 386/240, 241, 248
See application file for complete search history.

(56) References Cited

U.S. PATENT DOCUMENTS

| 6,073,115 A | 6/2000 | Marshall |
| 6,674,426 B1 | 1/2004 | McGee et al. |
| 6,744,436 B1 | 6/2004 | Chirieleison, Jr. et al. |
| 6,803,928 B2 | 10/2004 | Bimber et al. |
| 7,053,916 B2 | 5/2006 | Kobayashi et al. |
| 7,064,742 B2 | 6/2006 | Navab et al. |
| 7,215,322 B2 | 5/2007 | Genc et al. |
| 7,337,325 B2 | 2/2008 | Ikegami et al. |
| 7,493,559 B1 | 2/2009 | Wolff et al. |
| 7,779,450 B2 | 8/2010 | Ohmori |
| 7,796,155 B1 | 9/2010 | Neely, III et al. |

(Continued)

FOREIGN PATENT DOCUMENTS

| WO | 2007/010416 | 1/2007 | |
| WO | 2009/073978 | 6/2009 | |
| WO | WO 2009/073978 | * 6/2009 | ............ H04N 5/265 |

OTHER PUBLICATIONS

International Search Report and Written Opinion for Application No. PCT/US2012/029906, dated Jul. 13, 2013, pp. 1-22.

*Primary Examiner* — Daquan Zhao
(74) *Attorney, Agent, or Firm* — Fish & Richardson P.C.

(57) ABSTRACT

Computer-implemented techniques for viewing a recorded presentation are described. The techniques include receiving by one or more computers a request from a user to view a recorded presentation, retrieving, by one or more computing systems, a segment of the recorded presentation that is comprised of plural segments and information specifying times of occurrences of trigger events associated with corresponding segments in the recorded presentation, retrieving by the one or more computers private information of the user relevant to a first segment of the recorded presentation based on a first trigger event, generating, by the one or more computing systems, a re-cast first segment of the recorded presentation, with the re-cast first segment including the private information of the user, and sending by the one or more computing systems, the re-cast segment to a computing device associated with the user.

30 Claims, 8 Drawing Sheets

FIG. 8

(56) References Cited

U.S. PATENT DOCUMENTS

| | | |
|---|---|---|
| 2002/0031756 A1 | 3/2002 | Holtz et al. |
| 2002/0075282 A1 | 6/2002 | Vetterli et al. |
| 2003/0051255 A1 | 3/2003 | Bulman et al. |
| 2004/0001106 A1* | 1/2004 | Deutscher et al. ............ 345/838 |
| 2004/0233200 A1 | 11/2004 | Karren |
| 2007/0132785 A1 | 6/2007 | Ebersole, Jr. et al. |
| 2007/0237491 A1 | 10/2007 | Kraft |
| 2008/0074494 A1 | 3/2008 | Nemethy et al. |
| 2008/0218331 A1 | 9/2008 | Baillot |
| 2010/0146608 A1 | 6/2010 | Batie et al. |
| 2011/0018903 A1 | 1/2011 | Lapstun et al. |

* cited by examiner

AUGMENTED REALITY SYSTEM FOR RE-CASTING A SEMINAR WITH PRIVATE CALCULATIONS

This application claims priority under 35 U.S.C. §119 to U.S. Provisional Patent Application Ser. No. 61/466,095, filed Mar. 22, 2011, and entitled "Augmented Reality System for Re-casting a Seminar with Private Calculations", the entire contents of which are hereby incorporated by reference.

BACKGROUND

This invention relates to tools that augment a broadcast.

Business often conducts public broadcasts of seminars or meetings to individuals. One particular example is a public seminar conducted by financial services firms for individuals. Such seminars are used by financial services organizations to present to, e.g., customers information for various purposes such as to sell goods/services, answer questions, and/or provide information about a service.

Conventionally, a public seminar uses generic, non-private information that is displayed to all of the customers viewing the seminar Often the public seminar is recorded for later re-broadcast for additional presentations. The public seminar includes plural segments, with each segment corresponding to a different portion, e.g. topic covered by the public seminar. In such a recorded presentation of the public seminar, the customer views the re-broadcasted seminar with the generic non-private information using a client system. For convenience the customer views at his leisure such as when at home.

SUMMARY

According to an aspect, a computer-implemented method includes receiving by one or more computers a request from a user to view a recorded presentation, retrieving, by one or more computing systems, a segment of the recorded presentation that is comprised of plural segments and information specifying times of occurrences of trigger events associated with corresponding segments in the recorded presentation, retrieving by the one or more computers private information of the user relevant to a first segment of the recorded presentation based on a first trigger event, generating, by the one or more computing systems, a re-cast first segment of the recorded presentation, with the re-cast first segment including the private information of the user, and sending by the one or more computing systems, the re-cast segment to a computing device associated with the user.

According to an additional aspect, an electronic system includes one or more processing devices; and one or more computer-readable storage devices configured to store instructions that are executable by the one or more processing devices to configured the one or more processing devices to receive a request from a user to view a recorded presentation, retrieve a segment of the recorded presentation that is comprised of plural segments and information specifying times of occurrences of trigger events associated with corresponding segments in the recorded presentation, retrieve private information of the user relevant to a first segment of the recorded presentation based on a first trigger event, generate a re-cast first segment of the recorded presentation, with the re-cast first segment including the private information of the user, and send the re-cast segment to a computing device associated with the user.

According to an additional aspect, a computer program product tangibly stored on one or more computer-readable storage devices includes instructions that are executable by one or more processing devices to receive a request from a user to view a recorded presentation, retrieve a segment of the recorded presentation that is comprised of plural segments and information specifying times of occurrences of trigger events associated with corresponding segments in the recorded presentation, retrieve private information of the user relevant to a first segment of the recorded presentation based on a first trigger event, generate a re-cast first segment of the recorded presentation, with the re-cast first segment including the private information of the user, and send the re-cast segment to a computing device associated with the user.

The above techniques can include additional features. The re-cast segment is one of a plurality of re-cast segments that comprise a re-cast presentation. The re-cast segment when rendered on a display device renders a visual representation of the private information in juxtaposition to a visual representation of the first segment of the recorded presentation according to the first trigger event. Techniques can further include retrieving information specifying an occurrence of a second, different trigger event, and with processing the private information further including processing the private information to provide information that is relevant to a segment of the recorded presentation associated with the second trigger event. The techniques further include generating a second re-cast segment corresponding to the segment of the recorded presentation associated with the second trigger event of the recorded presentation, with the second re-cast segment including the private information of the user. Display of the first re-cast segment is synchronized to occur following the first trigger event. Display of the first re-cast segment is synchronized to occur following the first trigger event and display of the second re-cast segment is synchronized to occur following the occurrence of the second trigger event. Retrieving private information includes retrieving private information in accordance with the topic of the segment of the recorded presentation. Techniques can further include detecting a start of the re-cast segment by determining that a current amount of time elapsed from the start of the re-cast segment corresponds to an amount of elapsed time as the trigger event.

According to an additional aspect, a computer-implemented method includes recording, by one or more computing systems and an image input device, a segment of a live presentation that is comprised of plural segments, identifying each segment of the recorded presentation by tagging each segment of the presentation with information specifying a topic of the segment and information specifying an occurrence of a trigger event associated with the segment, and storing by the one or more computing systems, the recorded presentation.

According to an additional aspect, an electronic system includes one or more processing devices, an image input device and one or more computer-readable storage devices configured to store instructions that are executable by the one or more processing devices to configured the one or more processing devices to record a segment of a live presentation that is comprised of plural segments, identify each segment of the recorded presentation by tagging each segment of the presentation with information specifying a topic of the segment and information specifying an occurrence of a trigger event associated with the segment, and store the recorded presentation.

According to an additional aspect, a computer program product tangibly stored on one or more computer-readable storage devices comprising instructions that are executable by the one or more processing devices to record a segment of a live presentation that is comprised of plural segments, identify each segment of the recorded presentation by tagging each segment of the presentation with information specifying a topic of the segment and information specifying an occurrence of a trigger event associated with the segment and store the recorded presentation.

DESCRIPTION OF DRAWINGS

The accompanied figures are to be used in conjunction with the description below.

The details of one or more embodiments of the invention are set forth in the accompanying drawings and the description below. Other features, objects, and advantages of the invention will be apparent from the description and drawings, and from the claims.

DETAILED DESCRIPTION

Through a computer system (not shown), a seminar leader conducts a public seminar. Typically, the seminar leader displays for customers in attendance at the public seminar a series of slides and/or pre-recorded text with live explanations. The seminar leader navigates among different segments of the seminar. The seminar leader generates "trigger events," either prior to or while conducting the seminar. These trigger events are produced using a user interface device (e.g., a mouse, a keyboard, remote control device, and so forth) that is configured to cause the computer system to display a next slide or other material. The trigger event and the slide, or other material, are associated together by a computer system or the like. The seminar is recorded as the seminar appeared in the live presentation. The computer system stores the recorded the public seminar and associated trigger events as well as a time value corresponding to each trigger event. In particular, the computer system records an amount of time that has elapsed from when the public seminar began to the occurrence of each trigger event. Alternatively, the computer system records the number of trigger events and the order in which the slides were presented in relation to the trigger events.

Typically, a number of customers will attend a live session of the public seminar. This live session of the public seminar is recorded. As recorded, the public seminar uses generic, non-private information that is displayed to all of the customers attending the live presentation of the seminar. The public seminar includes a number of segments, with each segment corresponding to a different portion, e.g. topic covered by the public seminar.

Figure 1:
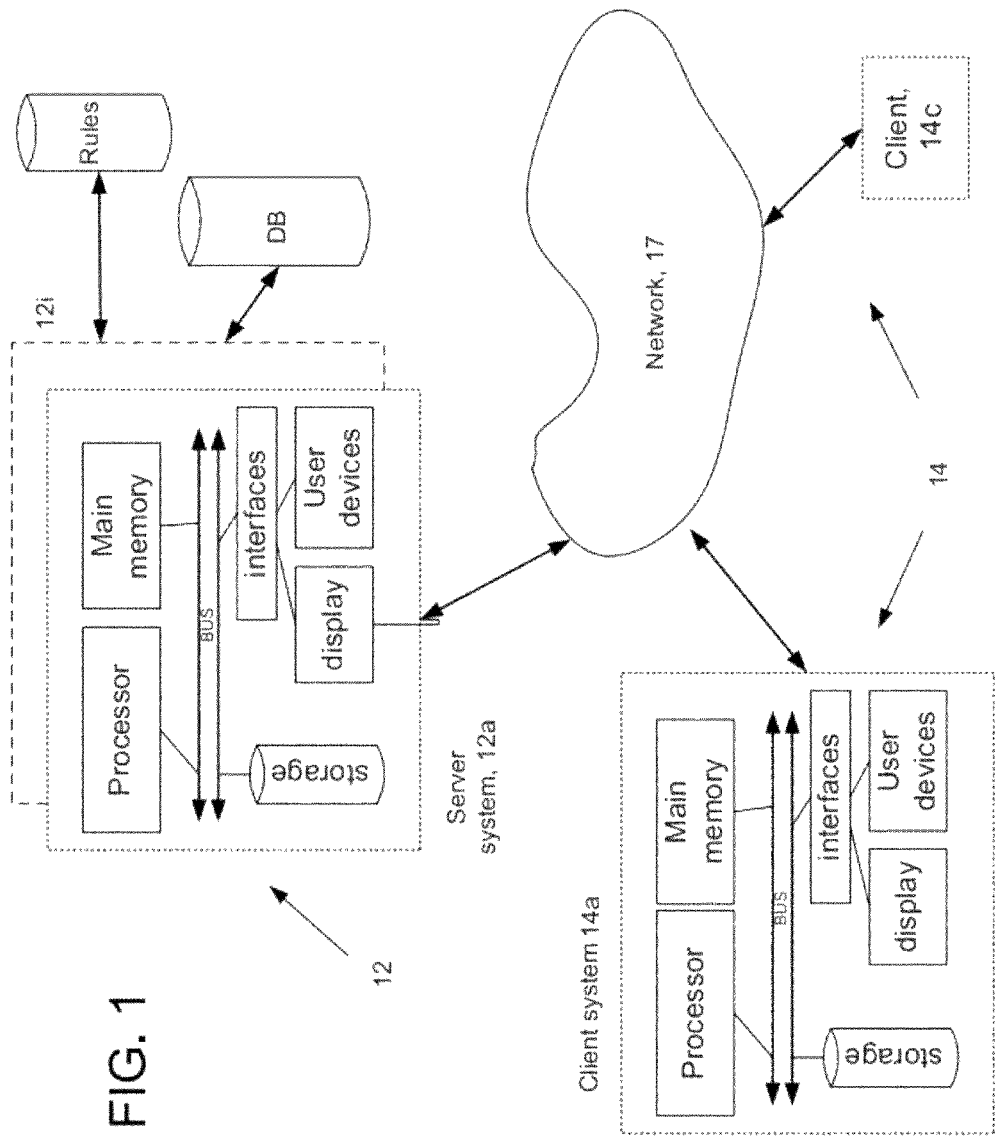
FIG. 1 is a block diagram.

Referring now to FIG. 1, a system 10 includes a server type of system 12 comprised of one or more computer systems 12a-12i, each computer system 12a-12i including a processor, memory and computer storage that stores a computer program product. When executed, the computer program product configures the server 12 to send a plurality of independent information feeds or message streams from the server 12 to a plurality of client devices, generally 14. The information feeds are received over a network 17 that is wired or wireless and that typically includes the Internet. The server 12 produces the independent information feeds for client devices 14 from the recorded presentation of the seminar and extracted private information pertaining to different users at each of the client systems 14 to re-cast the previously presented, recorded presentation with private information in place of generic information. The re-casted presentations are broadcasted to the one or more of the client systems 14 for users to view. Each individual re-casted presentation can have private data associated with the corresponding user inserted into the rebroadcast presentation in place of the generic information. The system 10 re-casts the public seminar which can be for example, a public seminar on financial matters such as mutual funds, retirement accounts and private investing, e.g., as a web-cast or other type of transmission, as discussed below. While the system re-casts the presentation, each of the re-casted presentations will contain different information.

The system 10 includes a database and a rules engine that retrieves private financial information corresponding to users that logged in using the client devices 14, for example, client device 14a. The system 10 processes the retrieved information to extracted relevant private information corresponding to a particular segment and particular slide based on a particular trigger event. The system substitutes the private information for the generic information that appears on the slide.

As an example, a segment includes a slide that is configured to render a financial statement that shows portfolio positions in brokerage accounts. The slide when rendered during the live broadcast is populated with generic data, since the slide will be displayed to various unrelated individuals. During a re-broadcast however to, e.g., plural users that have logged into system 10, system 10 causes the rules engine to extract relevant private information for each of the logged in users and generates a re-cast version of the slide for each of the logged in users. The rules engine either stores the generated re-cast slide as part of the re-cast presentation for subsequent broadcasting to the logged in users, or transmits each re-cast slide for each logged in user.

Figure 2:
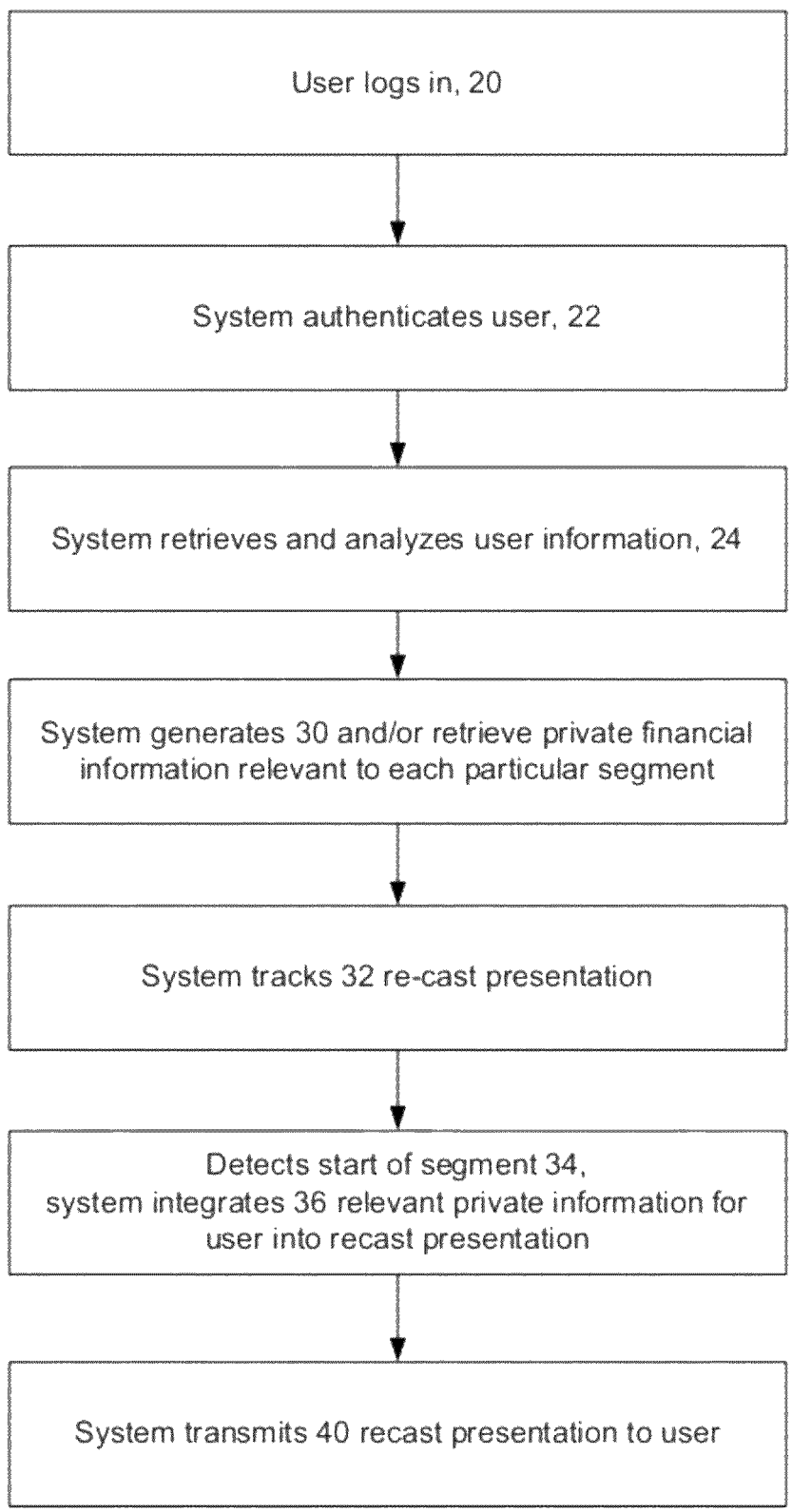
FIG. 2 is a flow chart of a re-cast process.

Referring now to FIG. 2, a user logs 20 into system 10 typically by accessing a web page on the Internet. After supplying requested credentials to authenticate 22 the user as an owner of one or more account(s) at the financial services firm, the system 10 retrieves 24 private information from the user's account(s). In an example, the system 10 verifies that user is authenticated to view private information when the user logs into the system. In this example, the user accesses the system via the client device 14a by accessing a graphical user interface (not shown) associated with the system 10 and inputting into the graphical user interface information that uniquely identifies the user as a customer of the financial institution. The system 10 analyzes this information to determine which private information is associated with the customer and which private information the customer is authenticated to view.

Still referring to FIG. 2, as the recorded presentation of the public seminar is played back on the client device 14a of the customer, the computer system 10 is configured to generate 30 and/or to retrieve private financial information of the customer's that is relevant to each particular segment of the recorded presentation. The system 10 tracks 32 when a new segment of the presentation begins by determining whether a current amount of time that has elapsed from the start of the presentation matches the amount of elapsed time for the occurrence of a trigger event. When the system detects 34 the start of a new segment, the system 10 integrates 36 private financial information of the customer that is relevant to the segment. The system 10 integrates this retrieved/generated private information with the current segment/slide of the re-cast seminar and sends 40 the re-cast seminar with the integrated retrieved/generated private information to the user's client device 14a.

Figure 3:
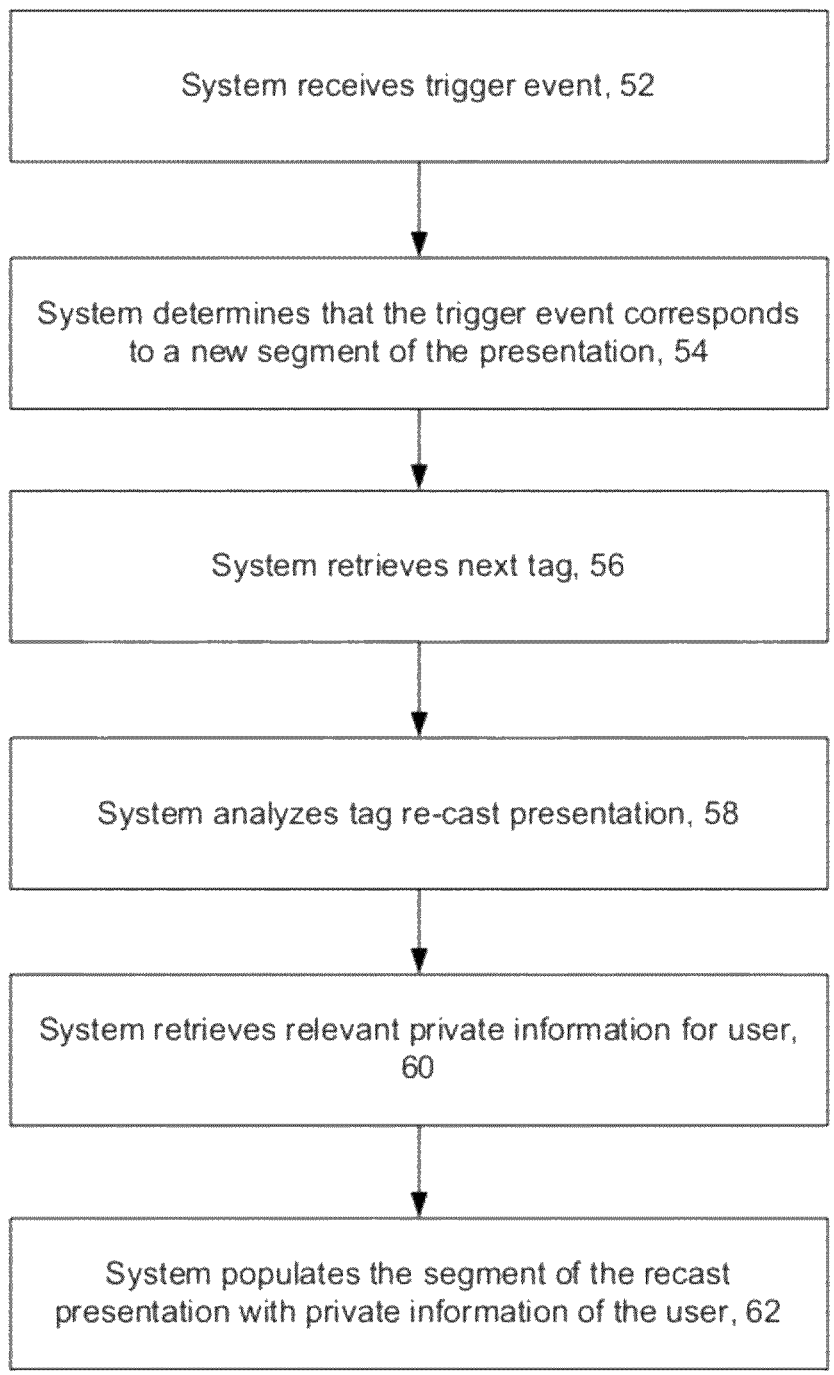
FIG. 3 is a flow chart of a process to determine a new segment.

Referring now to FIG. 3, an example of generating 36, the segments of the presentation had been previously tagged with information indicative of a topic of the segment, including, e.g., retirement investing, growth investing, mutual fund investing, and so forth is shown. This tag has information that specifies what types of data should be presented in a re-cast of each segment. For example, the tag could point to a structure that specifies data elements to be included within the re-cast of the segment.

The system receives 52 a corresponding trigger event. When the system 10 determines 54 that a new segment of the presentation is about to start, by measurement of the elapsed time, the system 10 retrieves 56 the next tag and analyzes 58 the tag associated with the upcoming segment to determine the topic associated with the segment and the data needed for that topic. Using the topic associated with the segment, the system retrieves 60 private information of the customer that is relevant to the segment. The system populates 62 the segment using the private information to replace the generic information that had been used in the live broadcast of the presentation.

For example one expeditious way to populate the segment is to substitute generic data used in a slide presentation, e.g., PowerPoint® (Microsoft, Inc.) with the private data. With the slides that are populated, being the same slides or at least the same templates of slides that were used in live presentation.

For example, a prerecorded video or presentation is used as a palette where video timeline tags can be applied. Tags correspond to placeholders for personal data of the customer such as charts or tables that are retrieved at run time for the particular customer and such data are overlaid onto streaming content in the presentation making the customer experience a mix of real-time and canned data. Each presentation for each different customer will be similar only in that the presentation uses the same "palette" and tags. However, for each presentation the data that the tags point to are to data for the particular customer. As an example the first tag in the series could be configured to retrieve an "income and expense" chart when the presenter is discussing income and expense. The chart would be populated with the data for the particular customer, making the experience personal. The second tag in the series could call a budget chart again that is specific to the customer.

Figure 4:
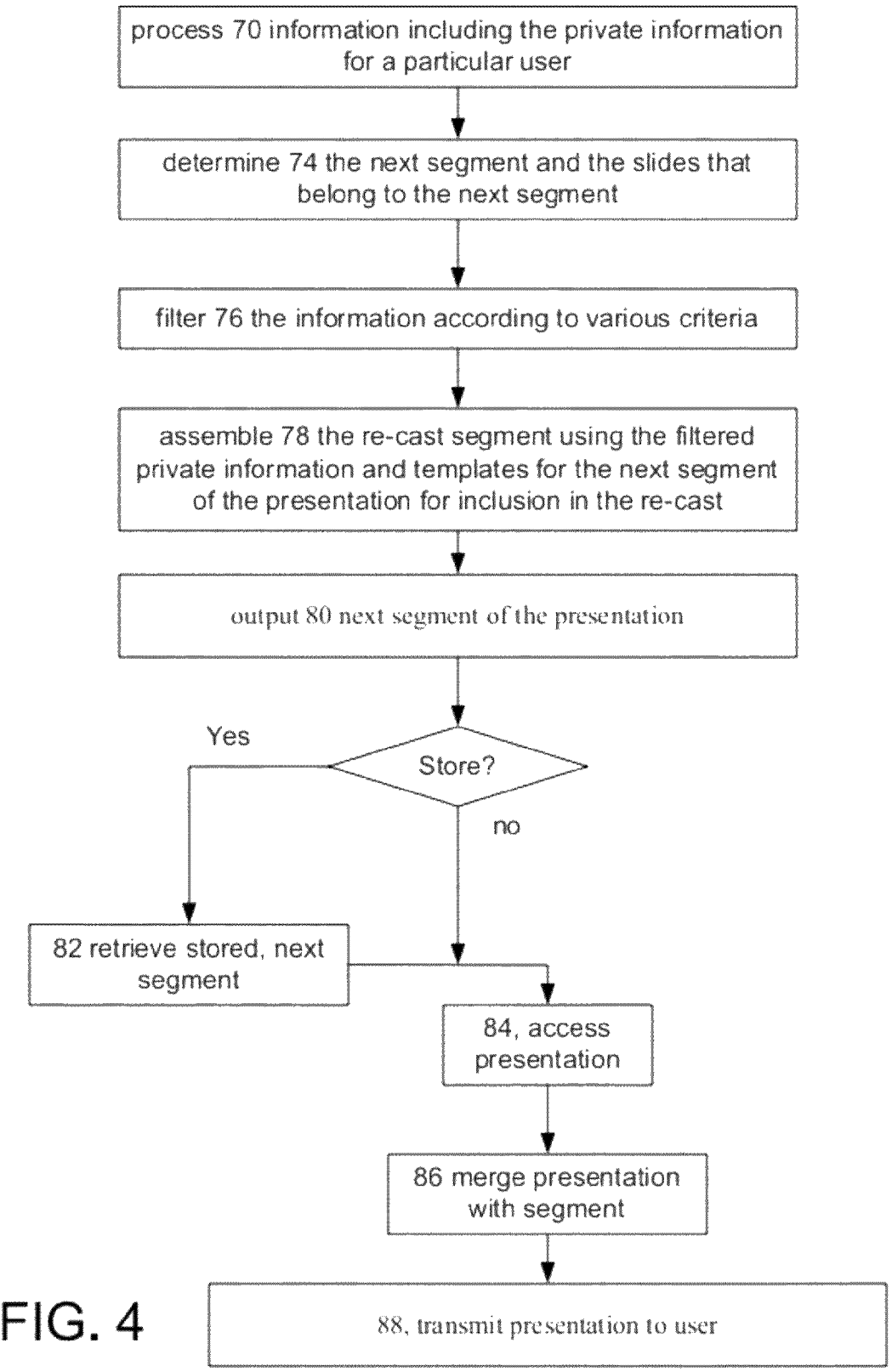
FIG. 4 is a flow chart of a process to form a re-cast.

Referring now to FIG. 4, an example of integrating 38 the private data with the saved presentation has the rules engine process 70 information including the private information for a particular user. The rules engine determines 74 the next segment and the slides that belong to the next segment. The rules engine filters 76 the information according to various criteria including information relevant to the next segment of the presentation, any authentication privileges, and the needed contents of each slide in the segment for inclusion in the re-cast. The rules engine assembles 78 the re-cast segment using the filtered private information and templates for the next segment of the presentation for inclusion in the re-cast. The rules engine outputs 80 next segment of the presentation either for storage and later transmission or to immediately transmit to the use, with the next segment of the presentation including the private information for which a particular user has been authenticated to view as determined or selected based on, e.g., a segment of the seminar and/or the tag.

The rules engine either retrieves 82 the saved next segment of the presentation with the private information included for the re-cast of the presentation or continues processing of the next segment of the presentation with the private information. The rules engine accesses 84 the saved presentation, which in this instance is simply a video of the live presentation that has been edited to remove any display of slides or other materials that had been presented, leaving a video image of the presenter and audio of the presenter as captured during the live presentation. The rules engine merges 86 the video image and audio with the slides of the next segment of the presentation with the private information to provide a re-cast segment. The rules engine assembles all re-cast segments in a similar manner either as a batch or on an "as needed basis." The rules engine transmits 88 the re-cast segment(s) with the private information to the particular user.

When the podcast, etc. is produced the easel is block off and the tag is used to retrieve an image with personal data. Each tag corresponds in a time line of video e.g., a personal chart. Software applications such as Flash, HTML-5 based applications, PowerPoint, etc. can be used. In general any application that can point to an image at an absolute position can be used. As a user queues up the presentation to watch, the system can start generating all of the recast slides, etc. with the private information at the same time. Thus, real-time data overlaid on canned data.

Figure 5:
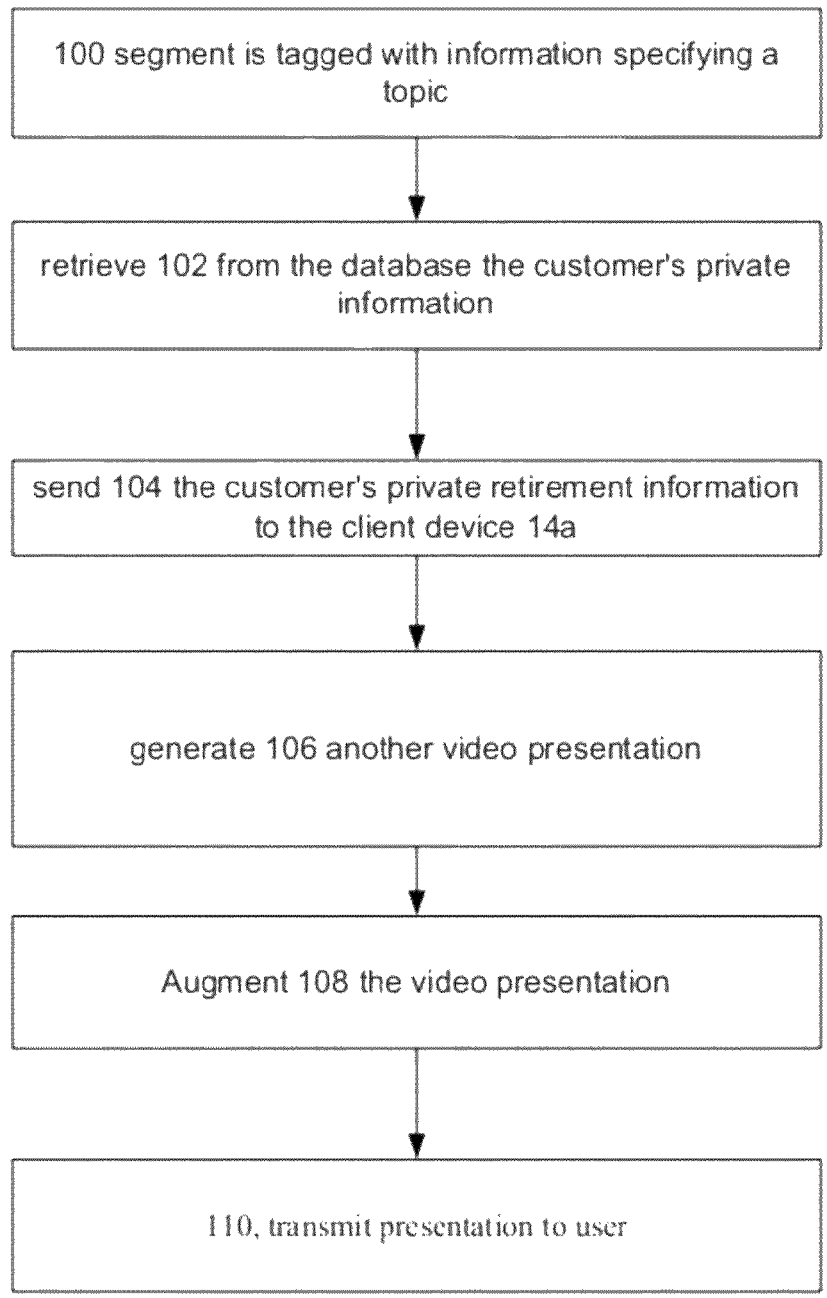
FIG. 5 is a flow chart of a process to form a re-cast.

Referring now to FIG. 5, in an example, a segment of the presentation is tagged 100 with information specifying that the topic of the segment relates to retirement investing. In this example, the system is configured to retrieve 102 from the database the customer's private information that is related to the customer's retirement accounts, including, e.g., 401k accounts, pension accounts, IRA accounts, and so forth. The system 10 is further configured to send 104 the customer's private retirement information to the client device 14a on which the customer is viewing the public seminar. The system 10 is configured to generate 106 another video presentation ("a re-cast presentation) that includes the customer's private information and the recorded presentation, as discussed above.

The re-cast presentation is configured to provide customers an opportunity to view the recorded presentation. In an example, the re-cast presentation when rendered on a display device renders a visual representation of the private information in juxtaposition to a visual representation of the segment of the presentation that follows the occurrence of the trigger event. In this example, the recorded presentation includes an audio recording of a seminar speaker conducting the seminar. The recorded presentation also includes a recording of the visual slides that were displayed during the seminar. Both the audio recording and the visual slides are included in the re-cast presentation. The re-cast presentation is augmented 108 with an image of the customer's private information where in the original presentation generic, exemplar account data were presented to the live audience and transmitted to the user.

Figure 6:
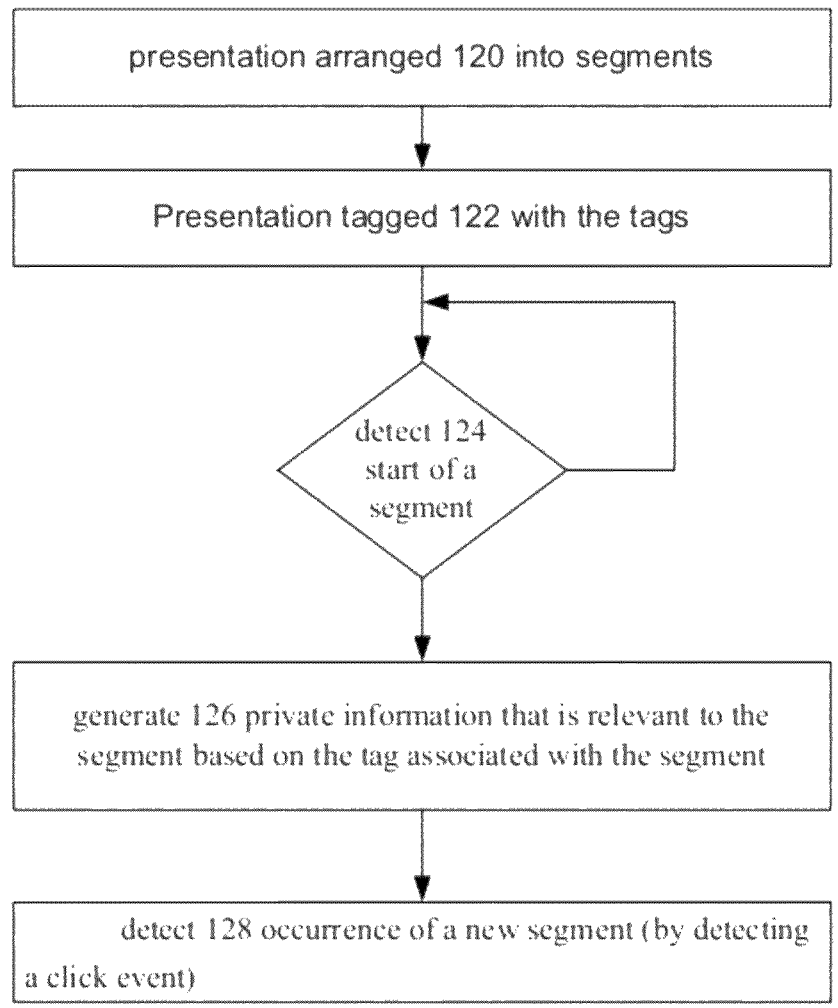
FIG. 6 is a flow chart of a process to form a re-cast.

Referring now to FIG. 6, the re-cast presentation arranged 120 into segments that correspond to segments of the recorded presentation. Additionally, the segments of the re-cast presentation are tagged 122 with the tags that were used in corresponding segments of the recorded presentation. As the re-cast presentation progresses, the system detects 124 a start of a segment of the re-cast presentation, for example, by determining whether a current amount of elapsed time for the re-cast presentation matches an amount of elapsed time in which the segment starts or by determining that a value of a number of preceding trigger events has occurred. The system generates 126 private information relevant to the segment based on the tag associated with the segment, as previously described.

As the re-cast presentation progresses, the system detects 128 the occurrence of a new segment (by detecting a click event) and in response augments 130 the re-cast presentation by inserting into the re-cast presentation a visual depiction of the private information for the customer. The re-cast presentation is then streamed to the client device of the customer, for example, in the home of the customer, as discussed above.

Figure 7:
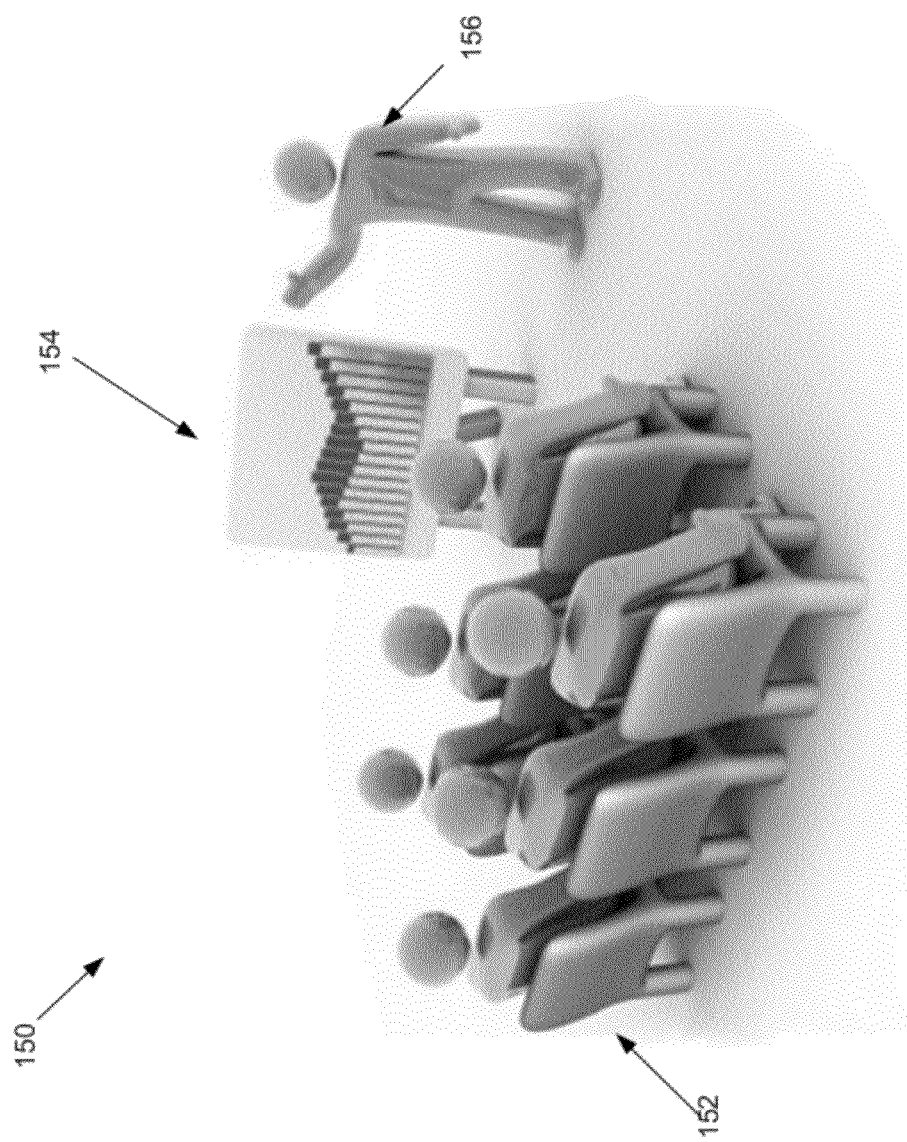
FIGS. 7 and 8 are pictorial representations of a seminar and a re-cast seminar.

Referring now to FIG. 7, an illustrative, pictorial example 150 of the live presentation is shown with an audience 152, graphics depicting generic information 154 and a presenter 156.

Figure 8:
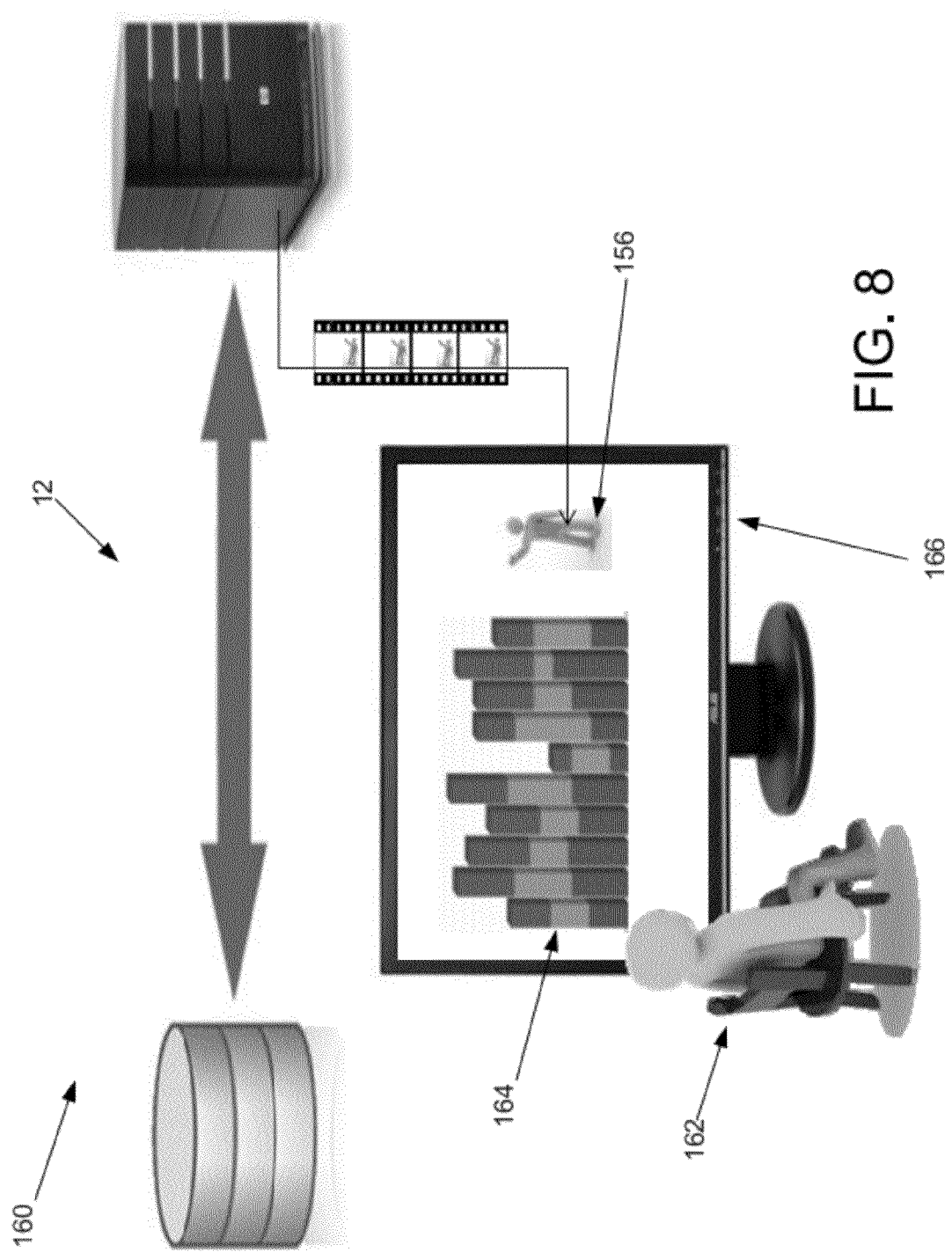

FIG. 8 depicts an illustrative, pictorial example 160 of the re-cast presentation with an individual 162, graphics depicting private information associated with the individual 164 that is juxtaposed video of the presenter 156 as in the live presentation of FIG. 7. The graphics are rendered on a display 166 controlled by the illustrative computer system 10.

Although the techniques described herein have been described with reference to financial information, the techniques are equally application other types of private information, including, e.g., private medical information, private academic information, private legal information, and so forth.

A block diagram of components of the system is also shown. Customer devices can be any sort of computing device capable of taking input from a customer and communicating over a network (not shown) with server and/or with other client devices. For example, customer device can be a mobile device, a desktop computer, a laptop, a cell phone, a private digital assistant ("PDA"), a server, an embedded computing system, a mobile device, as well as the eyeglasses, and so forth. Customer devices include a monitor device that renders the visual representations.

Exemplary eyeglasses are Wrap 920 VR Bundle from Vuzix Corporation 75 Town Centre Drive Rochester, N.Y. 14623. Such eyeglasses often referred to as video eyewear connects media players or video-out capable mobile phones or a laptop, netbook or desktop PC. Such eyewear typically includes a video eyewear a video e.g., VGA Adapter and tracker. Other examples from Vuzix include The Wrap™ 920AR augmented reality eyewear. Other examples include Z800 Pro AR head mounted display (single or dual VGA input version) standard or ruggedized distributed by Cyber-World, Inc. 60 De Bresoles Unit 202 Montreal, QC, Canada. In general such eyewear is a wearable display that presents a virtual large screen, stereo video capture, 6-degrees of freedom and head tracking.

Server can be any of a variety of computing devices capable of receiving information, such as a server, a distributed computing system, a desktop computer, a laptop, a cell phone, a rack-mounted server, and so forth. Server may be a single server or a group of servers that are at a same location or at different locations.

Server can receive information from client devices via interfaces. Interfaces can be any type of interface capable of receiving information over a network, such as an Ethernet interface, a wireless networking interface, a fiber-optic networking interface, a modem, and so forth. Server also includes a processor and memory. A bus system (not shown), including, for example, an information bus and a motherboard, can be used to establish and to control information communication between the components of server.

Processor may include one or more microprocessors. Generally, processor may include any appropriate processor and/or logic that is capable of receiving and storing information, and of communicating over a network (not shown). Memory can include a hard drive and a random access memory storage device, such as a dynamic random access memory, machine-readable media, or other types of non-transitory machine-readable storage devices.

Components also include storage device, which is configured to store information, map, map templates, rules information for the rules, software for the rules engine, etc.

Embodiments can be implemented in digital electronic circuitry, or in computer hardware, firmware, software, or in combinations thereof. Apparatus of the invention can be implemented in a computer program product tangibly embodied or stored in a machine-readable storage device and/or machine readable media for execution by a programmable processor; and method actions can be performed by a programmable processor executing a program of instructions to perform functions and operations of the invention by operating on input information and generating output. The invention can be implemented advantageously in one or more computer programs that are executable on a programmable system including at least one programmable processor coupled to receive information and instructions from, and to transmit information and instructions to, a information storage system, at least one input device, and at least one output device. Each computer program can be implemented in a high-level procedural or object oriented programming language, or in assembly or machine language if desired; and in any case, the language can be a compiled or interpreted language.

Suitable processors include, by way of example, both general and special purpose microprocessors. Generally, a processor will receive instructions and information from a read-only memory and/or a random access memory. Generally, a computer will include one or more mass storage devices for storing information files; such devices include magnetic disks, such as internal hard disks and removable disks; magneto-optical disks; and optical disks. Storage devices suitable for tangibly embodying computer program instructions and information include all forms of non-volatile memory, including by way of example semiconductor memory devices, such as EPROM, EEPROM, and flash memory devices; magnetic disks such as internal hard disks and removable disks; magneto-optical disks; and CD ROM disks. Any of the foregoing can be supplemented by, or incorporated in, ASICs (application-specific integrated circuits).

Other embodiments are within the scope and spirit of the description claims. For example, due to the nature of software, functions described above can be implemented using software, hardware, firmware, hardwiring, or combinations of any of these. Features implementing functions may also be physically located at various positions, including being distributed such that portions of functions are implemented at different physical locations.

What is claimed is:
1. A computer-implemented method comprising:
receiving by one or more computers a request from a user to view a recorded presentation that is comprised of at least one segment;
authenticating by one or more computers the user to verify that the user is an authenticated user to view the private financial information;
retrieving, by one or more computing systems, a first segment of the recorded presentation and information specifying an occurrence of a trigger event associated with the first segment in the recorded presentation;
determining a topic of the retrieved segment;

determining by the one or more computers a type of private information of the authenticated user that is needed for the determined topic;

retrieving by the one or more computers from a database that holds customer private information data to provide the determined type of private information of the user;

generating by the one or more computers a re-cast of the retrieved segment by substituting the private information retrieved from the database associated with the topic of the retrieved segment of the recorded presentation, for generic information in the recorded presentation; and re-broadcasting, by the one or more computing systems, the re-cast of the retrieved segment of the recorded presentation, with the re-cast segment including the private financial information of the user with re-broadcasting being to a computing device associated with the user.

2. The computer-implemented method of claim 1, wherein the re-cast segment is one of a plurality of re-cast segments that comprise a re-cast presentation.

3. The computer-implemented method of claim 1, wherein the re-cast segment when rendered on a display device renders a visual representation of the private information in juxtaposition to a visual representation of the first segment of the recorded presentation according to the first trigger event.

4. The computer-implemented method of claim 1, the method further comprising:

retrieving, by the one or more computing systems, information specifying an occurrence of a second, different trigger event, and with processing the private information further comprising:

processing the private information to provide information that is relevant to a segment of the recorded presentation associated with the second trigger event.

5. The computer-implemented method of claim 4, further comprising:

generating, by the one or more computing systems, a second re-cast segment corresponding to the segment of the recorded presentation associated with the second trigger event of the recorded presentation, with the second re-cast segment including the private information of the user.

6. The computer-implemented method of claim 5 wherein display of the first re-cast segment is synchronized to occur following the first trigger event and display of the second re-cast segment is synchronized to occur following the occurrence of the second trigger event.

7. The computer-implemented method of claim 1 wherein display of the first re-cast segment is synchronized to occur following the first trigger event.

8. The computer-implemented method of claim 1 wherein retrieving private information comprises:

retrieving private information in accordance with the topic of the segment of the recorded presentation.

9. The computer-implement method of claim 1, further comprising:

detecting a start of the re-cast segment by determining that a current amount of time elapsed from the start of the re-cast segment corresponds to an amount of elapsed time as the trigger event.

10. A computer-implemented method comprising:

recording, by one or more computing systems and an image input device, a segment of a live presentation that is comprised of plural segments;

identifying each segment of the recorded presentation by tagging each segment of the presentation with tag information, the tag information specifying a topic of the segment and information specifying an occurrence of a trigger event associated with the segment;

storing by the one or more computing systems, the recorded presentation;

at a subsequent time, retrieving by the one or more computers from a database that holds customer private financial information, private financial information of an authenticated user, with the retrieved private financial information corresponding to the topic specified by the tag information of the segments; and generating, by the one or more computing systems, a re-cast of the segments of the recorded presentation, with the re-cast segments including the retrieved private financial information of the authenticated user.

11. An electronic system comprising:

one or more processing devices; and one or more computer-readable storage devices configured to store instructions that are executable by the one or more processing devices to configured the one or more processing devices to:

receive a request from a user to view a recorded presentation that is comprised of at least one segment;

retrieve a first segment of the recorded presentation and information specifying an occurrence of a trigger event associated with the first segment in the recorded presentation;

determine a topic of the retrieved segment;

determine a type of private information of the authenticated user that is needed for the determined topic;

retrieve from a database that hold customer private information data to provide the determined type of private information of the user;

generate a re-cast of the retrieved segment by substituting the private information retrieved from the database associated with the topic of the retrieved segment of the recorded presentation, for generic information in the recorded presentation; and re-broadcast the re-cast of the retrieved segment of the recorded presentation, with the re-cast segment including the private financial information with re-broadcast being to a computing device associated with the user.

12. The electronic system of claim 11 wherein the re-cast segment is one of a plurality of re-cast segments that comprise a re-cast presentation.

13. The electronic system of claim 11 wherein the re-cast segment when rendered on a display device renders a visual representation of the private information in juxtaposition to a visual representation of the first segment of the recorded presentation according to the first trigger event.

14. The electronic system of claim 11, further configured to:

retrieve information specifying an occurrence of a second, different trigger event, and with processing the private information further comprising:

process the private information to provide information that is relevant to a segment of the recorded presentation associated with the second trigger event.

15. The electronic system of claim 14, further configured to:

generate a second re-cast segment corresponding to the segment of the recorded presentation associated with the second trigger event of the recorded presentation, with the second re-cast segment including the private information of the user.

16. The electronic system of claim 15 wherein display of the first re-cast segment is synchronized to occur following the first trigger event and display of the second re-cast segment is synchronized to occur following the occurrence of the second trigger event.

17. The electronic system of claim 11 wherein display of the first re-cast segment is synchronized to occur following the first trigger event.

18. The electronic system of claim 11, further configured to:
retrieve private information in accordance with the topic of the segment of the recorded presentation.

19. The electronic system of claim 11, further configured to:
detect a start of the re-cast segment by determining that a current amount of time elapsed from the start of the re-cast segment corresponds to an amount of elapsed time as the trigger event.

20. An electronic system comprising:
one or more processing devices;
an image input device; and
one or more computer-readable storage devices configured to store instructions that are executable by the one or more processing devices to configured the one or more processing devices to:
record a segment of a live presentation that is comprised of plural segments;
identify each segment of the recorded presentation by tagging each segment of the presentation with tag information, the tag information specifying a topic of the segment and information specifying an occurrence of a trigger event associated with the segment; and
store the recorded presentation;
at a subsequent time,
retrieve from a database that stores customer private information, private financial information of an authenticated user, with the retrieved private financial information corresponding to the topic specified by the tag information of the segments; and
generate a re-cast of the segments of the recorded presentation, with the re-cast segments including the retrieved private financial information of the authenticated user.

21. A computer program product tangibly stored on one or more computer-readable storage devices storing instructions that are executable by the one or more processing devices to:
receive a request from a user to view a recorded presentation that is comprised of at least one segment;
retrieve a first segment of the recorded presentation and information specifying an occurrence of a trigger event associated with the first segment in the recorded presentation;
determine a topic of the retrieved segment;
determine a type of private information of the authenticated user that is needed for the determined topic;
retrieve from a database that hold customer private information data to provide the determined type of private information of the user;
generate a re-cast of the retrieved segment by substituting the private information retrieved from the database associated with the topic of the retrieved segment of the recorded presentation, for generic information in the recorded presentation; and
re-broadcast the re-cast of the retrieved segment of the recorded presentation, with the re-cast segment including the private financial information
with re-broadcast being to a computing device associated with the user.

22. The product of claim 21 wherein the re-cast segment is one of a plurality of re-cast segments that comprise a re-cast presentation.

23. The product of claim 21 wherein the re-cast segment when rendered on a display device renders a visual representation of the private information in juxtaposition to a visual representation of the first segment of the recorded presentation according to the first trigger event.

24. The product of claim 21, further comprising instructions to:
retrieve information specifying an occurrence of a second, different trigger event, and with processing the private information further comprising:
process the private information to provide information that is relevant to a segment of the recorded presentation associated with the second trigger event.

25. The product of claim 24, further comprising instructions to:
generate a second re-cast segment corresponding to the segment of the recorded presentation associated with the second trigger event of the recorded presentation, with the second re-cast segment including the private information of the user.

26. The product of claim 25 wherein display of the first re-cast segment is synchronized to occur following the first trigger event and display of the second re-cast segment is synchronized to occur following the occurrence of the second trigger event.

27. The product of claim 21 wherein display of the first re-cast segment is synchronized to occur following the first trigger event.

28. The product of claim 21, further comprising instructions to:
retrieve private information in accordance with the topic of the segment of the recorded presentation.

29. The product of claim 21, further comprising instructions to:
detect a start of the re-cast segment by determining that a current amount of time elapsed from the start of the re-cast segment corresponds to an amount of elapsed time as the trigger event.

30. A computer program product tangibly stored on one or more computer-readable storage devices storing instructions that are executable by the one or more processing devices to:
record a segment of a live presentation that is comprised of plural segments;
identify each segment of the recorded presentation by tagging each segment of the presentation with tag information, the tag information specifying a topic of the segment and information specifying an occurrence of a trigger event associated with the segment; and
store the recorded presentation;
at a subsequent time,
retrieve from a database that stores customer private information, private financial information of an authenticated user, with the retrieved private financial information corresponding to the topic specified by the tag information of the segments; and
generate a re-cast of the segments of the recorded presentation, with the re-cast segments including the retrieved private financial information of the authenticated user.

* * * * *